United States Patent [19]

Kimura

[11] Patent Number: 5,457,889
[45] Date of Patent: Oct. 17, 1995

[54] JAM-FREE SHEARING MACHINE FOR THREADED RODS

[75] Inventor: Kiyoshi Kimura, Fujisawa, Japan

[73] Assignee: Kabushiki Kaisha Ogura, Kanagawa, Japan

[21] Appl. No.: 182,473

[22] Filed: Jan. 18, 1994

[30] Foreign Application Priority Data

Mar. 1, 1993 [JP] Japan .................. 5-007908 U

[51] Int. Cl.⁶ .................................................. B26B 15/00
[52] U.S. Cl. ................................. 30/228; 30/42; 83/605
[58] Field of Search ........................ 30/92, 210, 216,
30/228, 226, 233, 134, 360, 361, 90.2,
90.3, 180, 241; 83/605

[56] References Cited

U.S. PATENT DOCUMENTS 2,750,667  6/1956  Johnson ................................. 30/228
4,722,257  2/1988  Deon et al. ........................... 83/605

Primary Examiner—Douglas D. Watts
Attorney, Agent, or Firm—Dickstein, Shapiro & Morin

[57] ABSTRACT

A portable, power-driven machine for cutting a threaded rod to any required length by the shearing action of a movable cutting bit thrust past a fixed cutting bit. Each cutting bit has a series of semicircular internal threads for mating engagement with the threaded rod, and a cutting face disposed perpendicular to the axis of the internal threads. A depression with a depth less than the thread pitch is formed in the cutting face of the fixed cutting bit. When the threaded rod is sheared, to one rod section is partly received in the depression at the end of the cutting stroke of the movable cutting bit, in order to prevent the jamming engagement of the movable cutting bit with the rod section through their mating threads. A similar depression is formed in the cutting face of the movable cutting bit in an alternate embodiment of the invention.

4 Claims, 6 Drawing Sheets

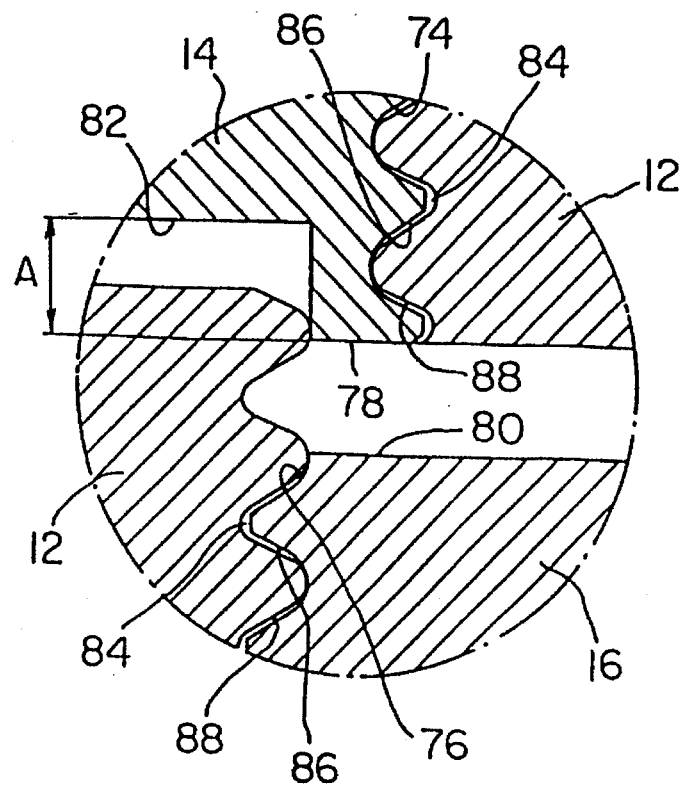
F I G. 5
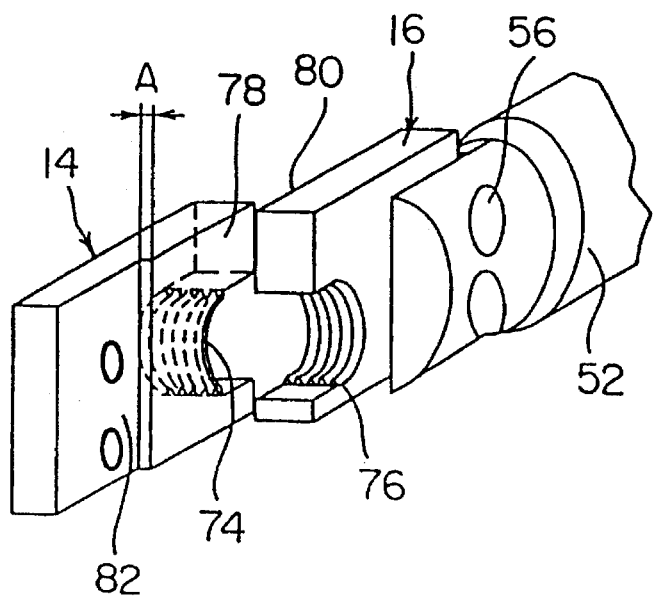
F I G. 6

JAM-FREE SHEARING MACHINE FOR THREADED RODS

BACKGROUND OF THE INVENTION

This invention relates generally to apparatus for cutting threaded rods to any required lengths without ruining the threads thereon, and more specifically to a machine comprising a fixed and a movable cutting bit, the latter being power driven for linear travel past the fixed cutting bit for shearing threaded rods. Still more specifically, the invention deals with provisions in such shearing machines for preventing the jamming engagement of the movable cutting bit with the threaded rod when the rod is sheared.

Portable, power-driven shearing machines for threaded rods have been known in which both fixed and movable cutting bits have each a semicircular recess bearing a series of internal screw threads of the same pitch as that of the thread on the rod to be cut. The internal threads on the cutting bits are designed to mate with the thread on the rod being cut. As the movable cutting bit is thrust past the fixed cutting bit, as by a hydraulic cylinder of the familiar single acting, spring return type built into the machine, the threaded rod is cut by shearing action between the parallel cutting faces of the two cutting bits.

The shearing machines of the foregoing general construction offers the advantage that threaded rods can be readily cut to any required lengths without ruining the threads thereon, with the result that mating nuts can be smoothly turned onto such rod lengths. Conventionally, however, this advantage was limited only to cases where the machines were put to use with relatively small diameter rods. The machines had a serious drawback with larger diameter rods.

Any threaded rod undergoes elastic deformation when sheared, to an extent depending upon the diameter of the rod and the shearing force exerted thereon. The elastic deformation includes a component in the longitudinal direction of the rod, which component initially causes either of the separated sections of the rod to travel longitudinally away from the other rod section. Then the rod section in question recoils and, conventionally, has butted fast against either of the cutting bits. For this reason, the movable cutting bit has so far been easy to stick to either of the separated rod sections.

As has been mentioned, the shearing machines of the class under consideration usually employ a single acting, spring return hydraulic cylinder for driving the movable cutting bit back and forth past the fixed cutting bit because this type of cylinder is far less expensive than the double acting type. Consequently, on sticking to either of the rod sections as above, the movable cutting bit has conventionally been prone to become unretractable to its initial position under the force of the return spring, particularly when the rod is of relatively large diameter.

SUMMARY OF THE INVENTION

The present invention seeks to prevent such jamming of the movable cutting bit with the threaded rod being cut, in shearing machines of the kind defined.

Briefly, the invention may be summarized as an apparatus for cutting a threaded rod having an external screw thread formed thereon with a known pitch. The apparatus comprises a fixed and a movable cutting bit, each having a series of semicircular internal screw threads formed thereon with the same pitch as the external thread on the threaded rod, and a cutting face disposed perpendicular to the axis of the internal threads. Also included are means for moving the movable cutting bit for linear reciprocation relative to the fixed cutting bit in order to cut the threaded rod by shearing action between the cutting faces of the fixed and the movable cutting bits. At least either of the fixed and the movable cutting bits has a depression formed in its cutting face. The depression can be as shallow as, typically, a quarter of the pitch of the internal threads on the cutting bits and, therefore, of the pitch of the thread on the rod.

When the threaded rod is sheared into two separate sections, either of these rod sections will recoil longitudinally and partly received in the depression in either of the two cutting bits, depending upon whether the rod has been sheared along the plane of the cutting face of the fixed or the movable cutting bit. The rod section in question is then free to move longitudinally, assuring smooth return of the movable cutting bit to its normal position even if an inexpensive spring return hydraulic cylinder is employed for moving the movable cutting bit back and forth past the fixed cutting bit.

The above and other features and advantages of this invention and the manner of realizing them will become more apparent, and the invention itself will best be understood, from a study of the following description and appended claims, with reference had to the attached drawings showing the best mode of carrying out the invention.

BRIEF DESCRIPTION OF THE DRAWINGS

FIG. 5 is an enlarged section through the fixed and the movable cutting bits of the shearing machine shown together with the threaded rod after having been sheared as in FIG. 3;

FIG. 6 is an enlarged perspective view of the fixed and the movable cutting bits;

DESCRIPTION OF THE PREFERRED EMBODIMENT

Figure 1:
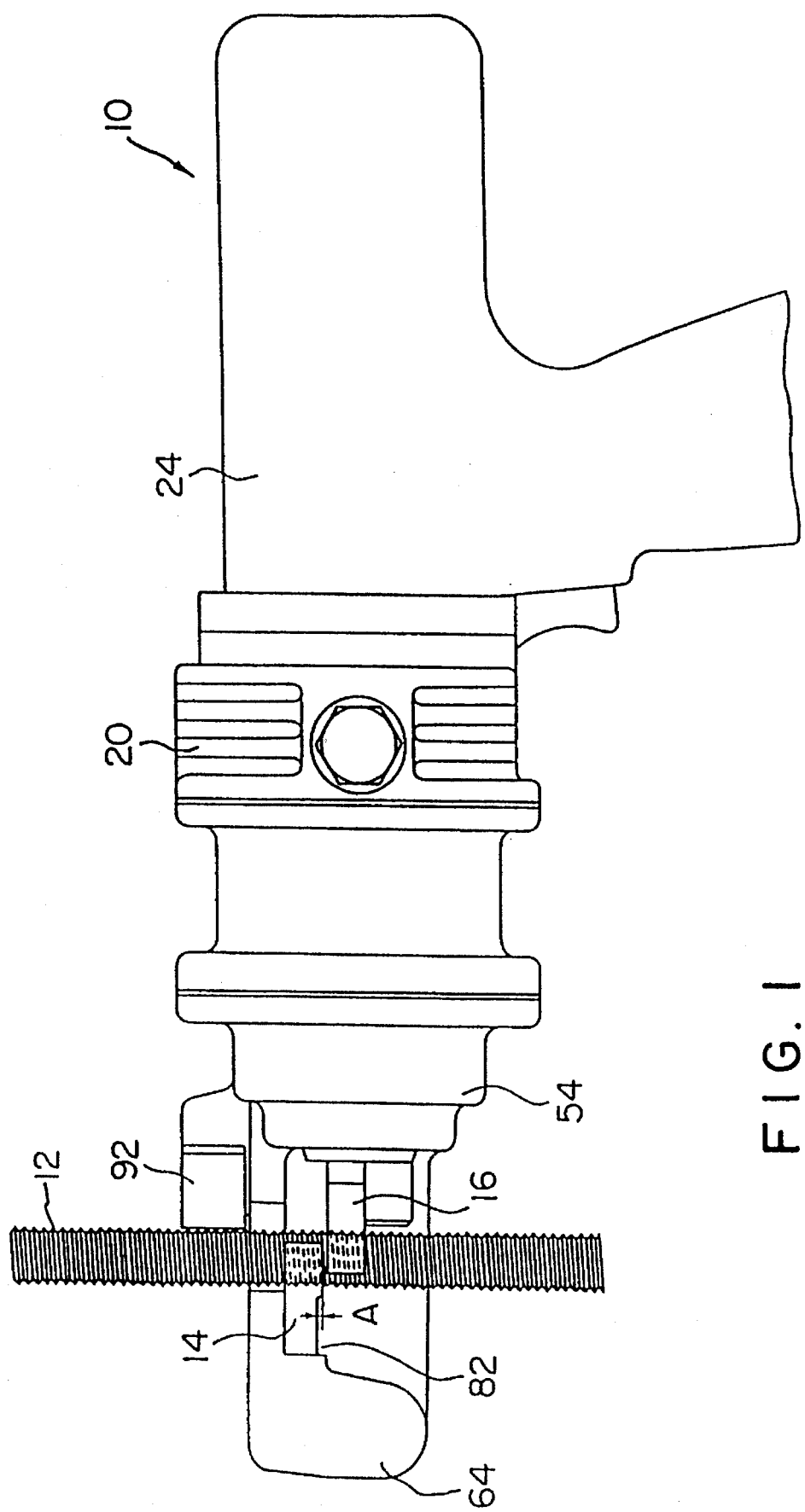
FIG. 1 is an elevation of the shearing machine embodying the principles of this invention, the machine being shown together with a threaded rod to be cut.
Figure 2:
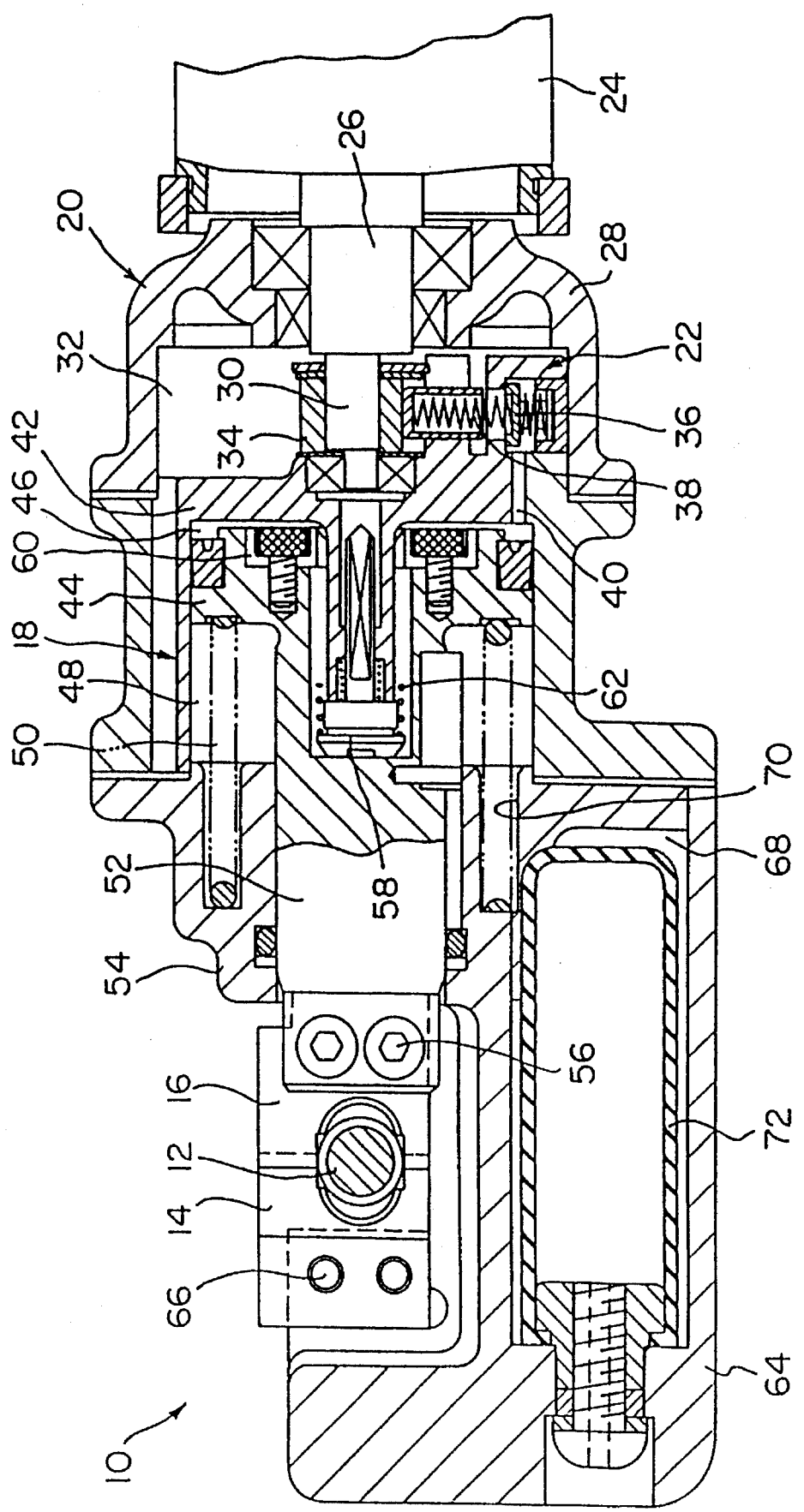
FIG. 2 is an enlarged, partial section through the shearing machine of FIG. 1.

The general construction of the representative shearing machine according to the invention will be best understood by referring to FIGS. 1 and 2. Generally designated 10, the shearing machine is therein shown together with a threaded rod 12 being cut. The threaded rod 12 is shown positioned between a fixed cutting bit 14 and a movable cutting bit 16.

The movable cutting bit 16 is to be thrust forwardly, or to the left as viewed in FIGS. 1 and 2, past the fixed cutting bit 14 for cutting the threaded rod 12 to any required length by shearing action between the two cutting bits. Both cutting bits 14 and 16 will be detailed later.

Employed for driving the movable cutting bit 16 back and forth is a hydraulic cylinder 18, FIG. 2, of the familiar single acting, spring return type housed in a casing 20 of the shearing machine 10. The hydraulic cylinder 18 is actuated by a pump 22 which also is housed in the casing 20.

The pump 22 is driven in turn by an electric motor 24 mounted to the rear end of the casing 20. The motor 24 has an armature shaft 26 rotatably extending through the rear end wall 28 of the casing 20 and terminating in an eccentric camshaft 30. This camshaft is disposed in a hydraulic fluid chamber 32 within the casing 20 which is to be filled with a hydraulic fluid such as oil. The pump 22 comprises a piston 34 rotatably mounted on the camshaft 30 for reciprocation in the fluid chamber 32, and a check valve 36, complete with a spring 38, which permits the flow of pressurized fluid from the fluid chamber into a fluid passageway 40 extending through a partition 42 within the casing 20.

Disposed just forwardly of the partition 42 is the noted hydraulic cylinder 18 having a piston 44 dividing the front part of the interior of the casing 20 into a fluid chamber 46 and a spring chamber 48. The cylinder fluid chamber 46 communicates with the pump fluid chamber 32 by way of the passageway 40. The spring chamber 48 accommodates a helical compression return spring 50. The piston 44 together with a piston rod 52 is therefore to be thrust forwardly by the pressurized fluid from the pump 22 and retracted by the return spring 50. The piston rod 52 pressure-tightly extends through, and projects outwardly of, the front wall 54 of the casing 20 and has the movable cutting bit 16 screwed at 56 to its front end.

As shown also in FIG. 2, the piston rod 52 has a return valve 58 built into it for returning the hydraulic fluid from cylinder fluid chamber 46 back into pump fluid chamber 32. Normally closed to discommunicate the cylinder fluid chamber 48 from the pump fluid chamber 32, the return valve 58 is opened as an inturned rim 60 of the cylinder piston 44 comes into abutment against a spring 62 with the forward travel of the piston.

Both FIGS. 1 and 2 depict a jaw 64 extending forwardly from, and formed in one piece with, the front wall 54 of the casing 20. The fixed cutting bit 14 is screwed at 66 to the front end of the jaw 64, in a position just off the path of the movable cutting bit 16. FIG. 2 reveals a cushioning chamber 68 formed in the jaw 64 in communication with the cylinder spring chamber 48 by way of an air passageway 70. The cushioning chamber 68 accommodates an air bag 72 which is capable of elastic deformation to cushion the impact of the forward travel of the cylinder piston 44.

Reference is now directed to FIGS. 3–6 for a closer study of the two cutting bits 14 and 16. The fixed cutting bit 14 has a recess of semicircular cross section to carry a series of internal screw threads 74 of corresponding shape which are centered about an axis normal to the direction of the travel of the movable cutting bit 16. The pitch of the internal threads 74 is the same as that of the external thread on the rod 12 to be cut. The movable cutting bit 16 is recessed similarly to bear a series of semicircular internal screw threads 76 which also are centered about an axis normal to the traveling direction of the movable cutting bit. The pitch of the internal threads 76 is also the same as the external thread on the rod 12.

Figure 3:
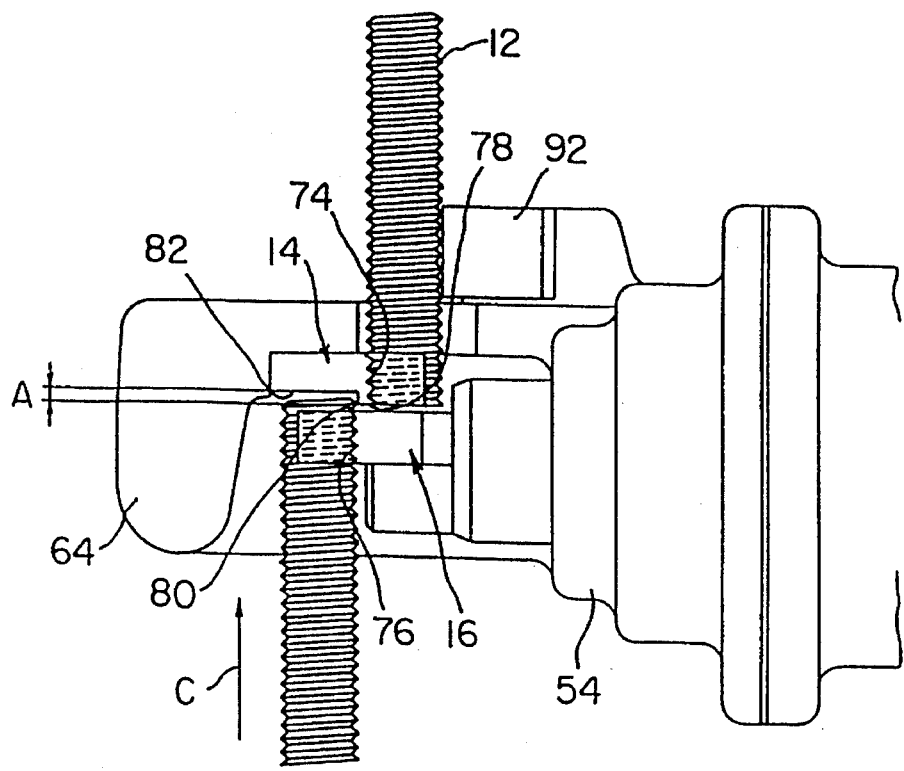
FIG. 3 is a partial elevation of the shearing machine shown together with the threaded rod after having been sheared.
Figure 4:
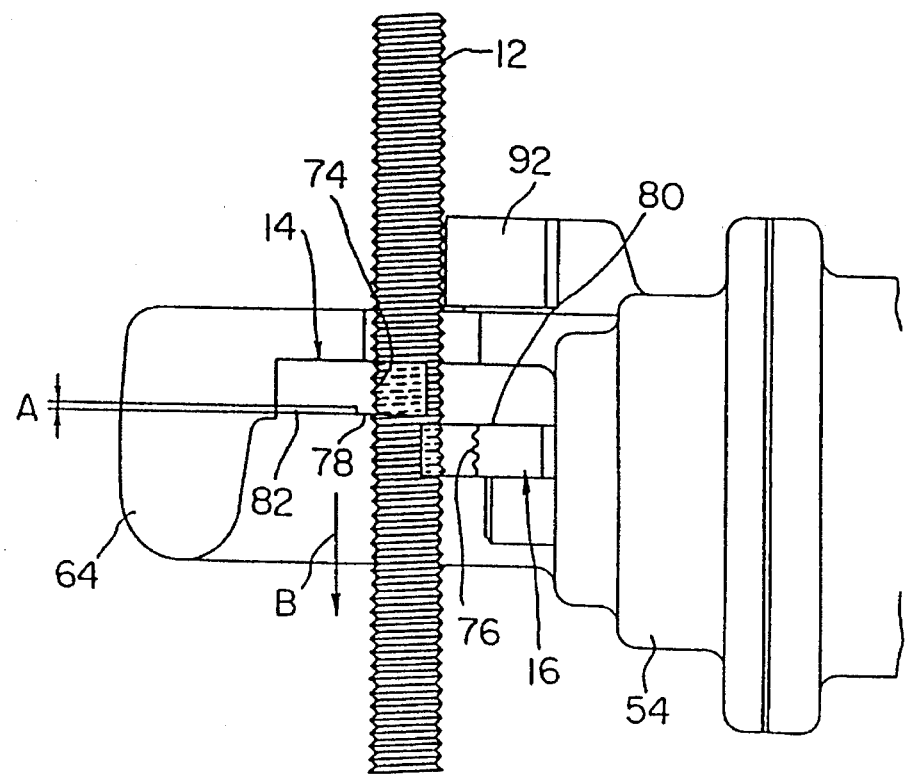
FIG. 4 is a view similar to FIG. 3 except that the threaded rod is shown before being sheared.

Thus, with the forward thrust of the movable cutting bit 16 from its FIG. 4 position to that of FIG. 3 past the fixed cutting bit 14, the rod 12 is to be cut by shearing action between the parallel cutting faces 78 and 80 of the two cutting bits 14 and 16. The cutting faces 78 and 80 are normal to the internal thread axes of the cutting bits 14 and 16. FIG. 5 indicates that the threaded rod 12 is sheared as above along the root of the thread thereon.

According to a feature of this invention, the fixed cutting bit 14 has a depression 82 formed in its cutting face 78, as shown in all of FIGS. 3–6 as well as in FIG. 1. The depression 82 is spaced from the threads 74 of the fixed cutting bit 14 in the forward traveling direction of the movable cutting bit 16, to such an extent that when the threaded rod 12 is cut into two separate sections as depicted in FIG. 5, one rod section on the side of the movable cutting bit will partly enter the depression at the end of the forward stroke of the movable cutting bit, rather than butting against the cutting face 78 of the fixed cutting bit. Thus left free to move in its longitudinal direction, the rod section will not jam with the movable cutting bit through their mating threads. More will be said on this subject in the course of the subsequent description of operation.

Experiment has proved that the depth A of the depression 82 can be less than the pitch of the threads on the cutting bits 14 and 16 and, therefore, on the rod 12 in order for the depression to fully serve its intended purposes under normal circumstances. Typically, the depression 82 is as shallow as a quarter of the thread pitch.

As has been stated, the threads 74 and 76 on the cutting bits 14 and 16 are of the same pitch as the thread on the rod 12. However, as clearly pictured in FIG. 5, the threads of the cutting bits 14 and 16 have a depth less than that of the thread on the rod 12, providing clearances 84 between the crests of the cutting bit threads and the roots of the rod thread. Clearances are also provided between the flanks 86 of the cutting bit threads and the flanks 88 of the rod thread. Consequently, according to another feature of the invention, only the crests of the rod thread contact the roots of the cutting bit thread when the threaded rod 12 is caught between the cutting bits 14 and 16 to be sheared. In this manner the cutting bit threads lying next to the cutting faces 78 and 80 are not to be ruined when the rod is sheared.

Figure 7:
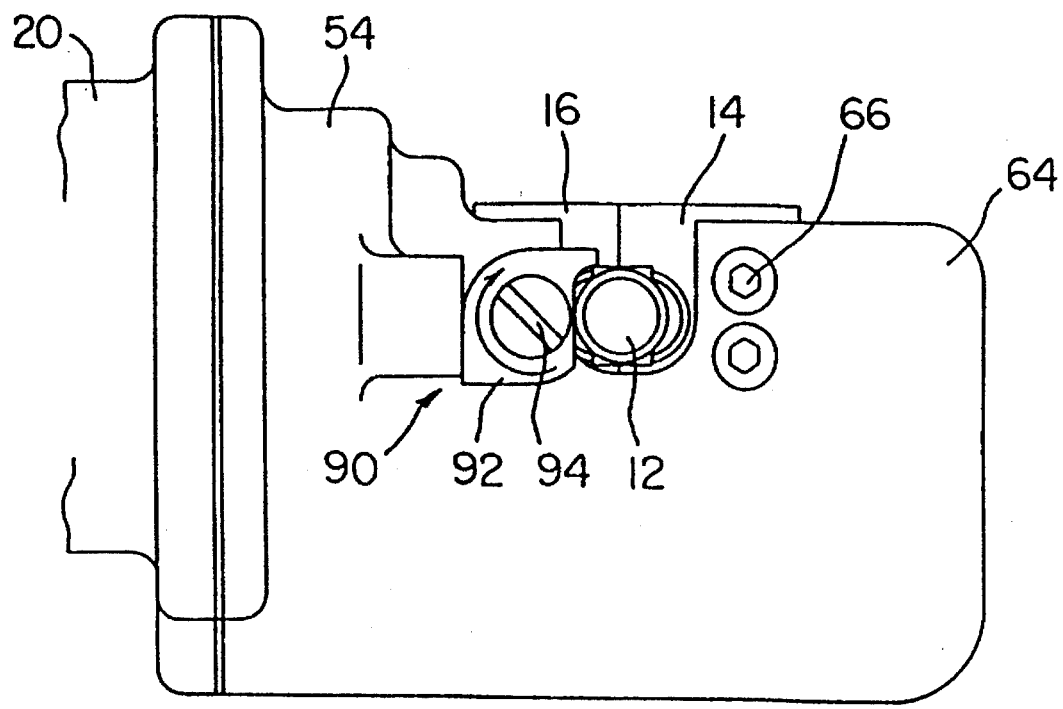
FIG. 7 is an enlarged partial elevation of the shearing machine, showing in particular a clamping mechanism for the threaded rod, the rod being here shown unclamped.
Figure 8:
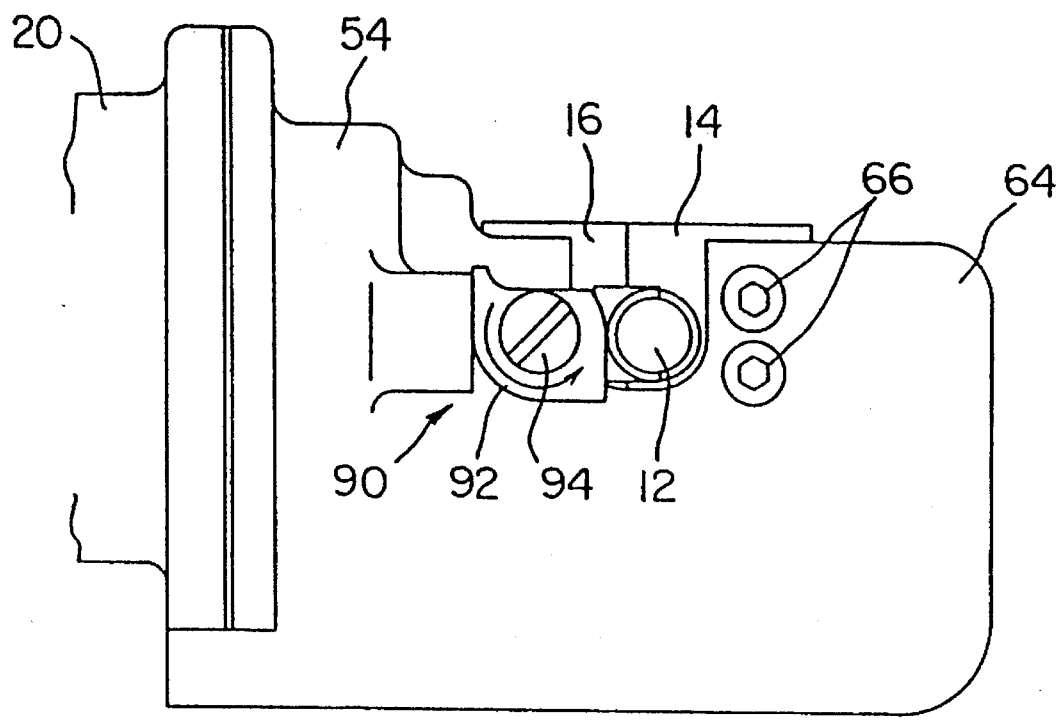
FIG. 8 is a view similar to FIG. 7 except that the clamping mechanism is shown clamping the threaded rod.

FIGS. 7 and 8 illustrate a rod clamping mechanism 90 for rigidly holding the threaded rod 12 during shearing, although this mechanism appears also in FIGS. 1, 3 and 4. The clamping mechanism 90 includes a clamp 92 which is rotatably screwed at 94 to the jaw 64 of the casing 20 for angular displacement between an unclamping position of FIG. 7 and a clamping position of FIG. 8. When in the FIG. 8 clamping position the clamp 92 presses the threaded rod 12 into threaded engagement with the fixed cutting bit 16.

In use of the shearing machine 10 of the foregoing construction, the threaded rod 12 to be sheared may be placed between the two cutting bits 14 and 16 as shown in FIG. 4, with the clamp 92 held in the unclamping position as in FIG. 7. Then the clamp 92 may be turned 90 degrees to the clamping position of FIG. 8 thereby clamping the rod 12 into mating engagement with the fixed cutting bit 16.

Then the electric motor 24 may be switched on. With the consequent rotation of the motor armature shaft 26 together with the camshaft 30, the piston 34 of the hydraulic pump 22 will pressurize the fluid in the fluid chamber 32 for delivery to the fluid chamber 46 of the hydraulic cylinder 18 via the check valve 36 and passageway 40. The pressurized fluid on flowing into the cylinder fluid chamber 46 will force the piston 44 forwardly, or to the left as viewed in FIG. 2, against the bias of the return spring 50. Thus thrust forwardly past the fixed cutting bit 14 from its FIG. 4 position to that of FIG. 3, the movable cutting bit 16 will cut the threaded rod 12 by shearing action between the cutting faces 78 and 80 of the two cutting bits 14 and 16. Both FIGS. 3 and 5 show the threaded rod 12 thus sheared.

Toward the end of the forward stroke of the piston 44, the inturned piston rim 60 will engage and compress the coil spring 62 thereby unseating the return valve 58. Thereupon the pressurized fluid will flow from the cylinder fluid chamber 46 back into the pump fluid chamber 32, with the consequent retraction of the piston 44 to the FIG. 2 position together with the movable cutting bit 16. One cycle of operation has now been completed.

In FIG. 5 is shown the threaded rod 12 sheared as above along the root of its thread and in the plane of the cutting face 78 of the fixed cutting bit 14 because the fixed cutting bit is assumed to have a sharper cutting edge than does the movable cutting bit 16 in this particular embodiment. In this case the shearing force exerted on the threaded rod 12 includes a component in the direction of the arrow B in FIG. 4. Consequently, when the rod is separated into two sections, that one of the rod sections which is located on the side of the movable cutting bit 14 recoils toward the fixed cutting bit 14, as indicated by the arrow C in FIG. 3.

Let it be assumed that the fixed cutting bit 14 had no depression 82 formed in its face 78, as had been the case heretofore. Then the rod section on the side of the movable cutting bit would butt fast against the cutting face 78 of the fixed cutting bit 14 on recoiling as shown in FIG. 4, resulting in the jamming of the movable cutting bit with that rod section through their mating threads. The movable cutting bit 16 would then fail to retract to its initial or normal position of FIGS. 2 and 4 under the force of the return spring 50 of the single acting hydraulic cylinder 18.

The present invention overcomes this inconvenience by providing the depression 82 in the fixed cutting bit 14. The rod section in question will then enter the depression 82 on recoiling, as illustrated in FIG. 5. Since then the rod section is free to move longitudinally, the movable cutting bit 16 will not jam with the rod section but will smoothly disengage therefrom and return to its starting position under the influence of the return spring 50.

It will also be appreciated that the smooth return of the movable cutting bit 16 is all the more assured as the clearances 84, FIG. 5, are provided between the flanks 86 of the cutting bit threads and the flanks 88 of the rod thread. Additionally, as the cutting bit threads contact the rod thread only between the roots of the former and the crests of the latter, the cutting bit threads, particularly those lying next to the cutting faces 78 and 80, are not to be ruined no matter how much force is required for shearing the rod.

Figure 9:
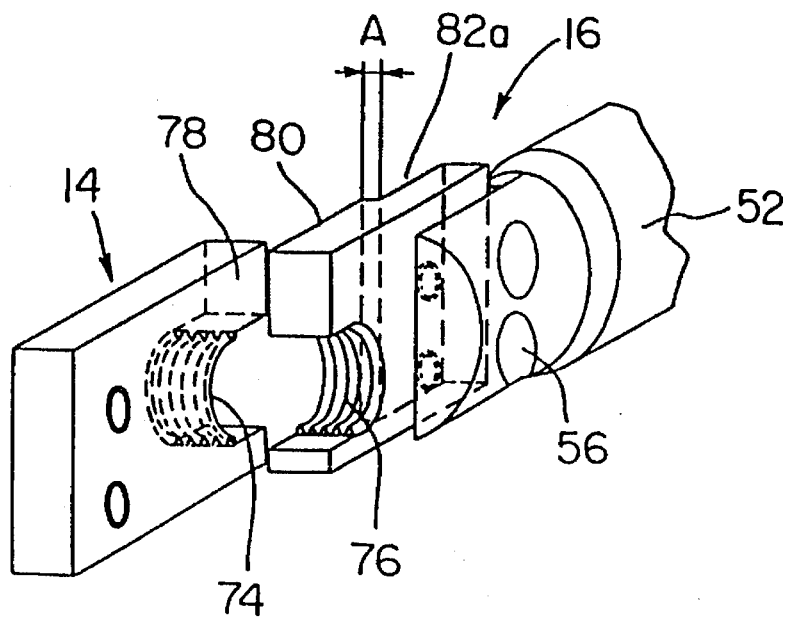
FIG. 9 is a perspective view similar to FIG. 6 but showing an alternate embodiment of the invention.
Figure 10:
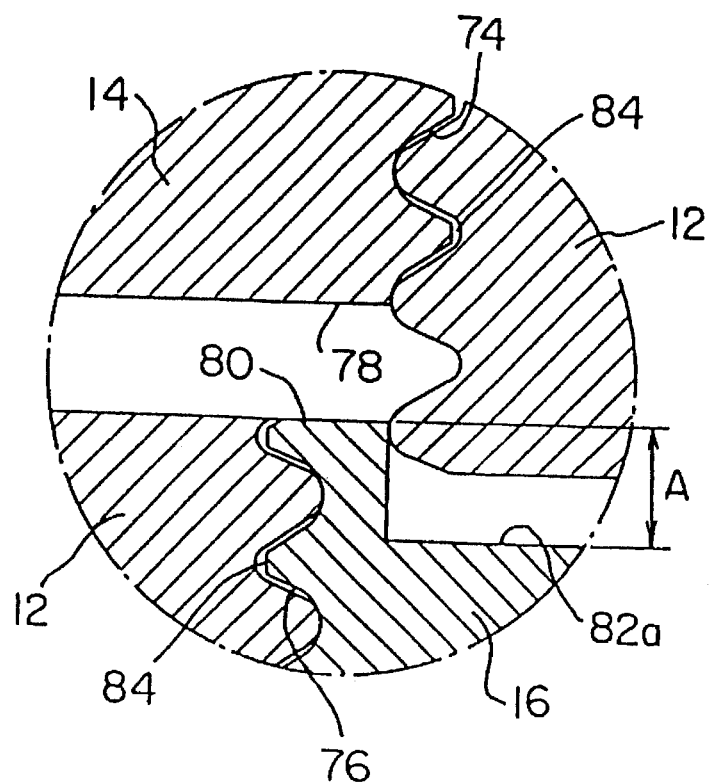
FIG. 10 is a view similar to FIG. 5 but showing the alternate embodiment of the invention.

FIGS. 9 and 10 show an alternate embodiment of the invention, in which a depression 82a is formed in the cutting face 80 of the movable cutting bit 16, instead of in the cutting face 78 of the fixed cutting bit 14 as in the preceding embodiment. The depression 82a is spaced from the threads 76 of the movable cutting bit 16 in the reverse traveling direction of the movable cutting bit, to such an extent that when the threaded rod 12 is cut into two separate sections as depicted in FIG. 10, the rod section on the side of the fixed cutting bit 14 will partly enter the depression at the end of the forward stroke of the movable cutting bit, rather than butting against the cutting face 80 of the movable cutting bit. The depth A of the depression 82a in relation to the thread pitch can be the same as that of the depression 82 of the preceding embodiment.

Although this alternate shearing machine is similar in the other details of construction to the shearing machine 10 of FIGS. 1 and 2, it is understood that the movable cutting bit 16 of the alternate machine has a sharper cutting edge than does its fixed cutting bit 14. Thus, in FIG. 10, the threaded rod 12 is shown to be sheared along the plane of the movable cutting bit 16. In this case it is the rod section on the side of the fixed cutting bit 14 which recoils toward the movable cutting bit 16, it being understood that the force of the clamp mechanism 90, FIGS. 7 and 8, is not strong enough to prevent such displacement of the rod section.

Were it not for the depression 82a, the rod section on so recoiling would butt against the movable cutting bit 16 so fast as to prevent, or seriously interfere with, its retraction under the force of the return spring. According to the invention, however, the rod section will then be partly received in the depression 82a and so become free to move longitudinally. The movable cutting bit 16 will therefore return to its initial position even though the rod section is temporarily admitted into its depression 82a.

Although the present invention has been shown and described hereinbefore in terms of but two preferable embodiments thereof, it is understood that a variety of modifications and alterations are possible within the broad teaching hereof. For instance, depressions similar to those designated 82 and 82a could be formed in the cutting faces of both cutting bits 14 and 16, instead of in the cutting face of either of the cutting bits as in the illustrated embodiments, in order to adapt the machine for shearing threaded rods by either cutting bit. It is therefore appropriate that the invention be construed broadly and in a manner consistent with the fair meaning or proper scope of the appended claims.

What is claimed is:

1. An apparatus for cutting a threaded rod having an external screw thread formed thereon with a given nominal diameter and a known pitch, the apparatus comprising:

(a) a fixed cutting bit having a first series of semicircular internal screw threads formed thereon with the same nominal diameter and pitch as the external thread on the threaded rod, the fixed cutting bit having a cutting face disposed perpendicular to the axis of the first series of internal screw threads;

(b) a movable cutting bit having a second series of semicircular internal screw threads formed thereon with the same nominal diameter and pitch as the external thread on the threaded rod, the movable cutting bit having a cutting face disposed perpendicular to the axis of the second series of internal screw threads;

(c) means for moving the movable cutting bit for linear reciprocation relative to the fixed cutting bit in order to cut the threaded rod by shearing action between the cutting faces of the fixed and the movable cutting bits;

(d) there being a depression formed in the cutting face of at least either of the fixed and the movable cutting bits in order to prevent the jamming engagement of the movable cutting bit with the threaded rod upon cutting of the threaded rod.

2. The apparatus of claim 1 wherein the depression has a depth less than the pitch of the threads on the fixed and the movable cutting bits.

3. The apparatus of claim 1 wherein the depression has a depth equal to approximately a quarter of the pitch of the threads on the fixed and the movable cutting bits.

4. An apparatus for cutting a threaded rod having an external screw thread formed thereon with a given nominal diameter and a known pitch, the apparatus comprising:

(a) a fixed cutting bit having a first series of semicircular internal screw threads formed thereon with the same nominal diameter and pitch as the external thread on the threaded rod, the fixed cutting bit having a cutting face disposed perpendicular to the axis of the first series of internal screw threads;

(b) a movable cutting bit having a second series of semicircular internal screw threads formed thereon with the same nominal diameter and pitch as the external thread on the threaded rod, the movable cutting bit having a cutting face disposed perpendicular to the axis of the second series of internal screw threads;

(c) means for moving the movable cutting bit for linear reciprocation relative to the fixed cutting bit in order to cut the threaded rod by shearing action between the cutting faces of the fixed and the movable cutting bits;

(d) there being a depression formed in the cutting face of at least either of the fixed and the movable cutting bits in order to prevent the jamming engagement of the movable cutting bit with the threaded rod upon cutting of the threaded rod; and wherein the threads on the fixed and movable cutting bits have a depth less than the depth of the thread on the threaded rod, wherein clearances are provided between the flanks of the threads on the fixed and the movable cutting bits and the flanks of the thread on the threaded rod, whereby only the roots of the threads on the fixed and the movable cutting bits contact the crests of the thread on the threaded rod during shearing, in order to prevent the threads on the fixed and the movable cutting bits from being ruined by shearing.

* * * * *